United States Patent [19]
Smith

[11] 3,714,663
[45] Jan. 30, 1973

[54] TIMING NUMBER GENERATOR
[75] Inventor: Clarence G. Smith, Irving, Tex.
[73] Assignee: Mobil Oil Corporation, New York, N.Y.
[22] Filed: Dec. 9, 1971
[21] Appl. No.: 206,408

[52] U.S. Cl. .........346/23, 340/15.5 TG, 340/324 A, 346/110
[51] Int. Cl..............................................G01d 1/00
[58] Field of Search .346/23, 110, 108, 33 C, 33 WL; 340/15.5 TG, 15.5 DS, 324 A, 324 AD

[56] References Cited

UNITED STATES PATENTS

| 2,929,669 | 3/1960 | Madeley et al. | 346/23 |
| 3,182,308 | 5/1965 | Dutton et al. | 340/324 AD X |
| 3,187,336 | 6/1965 | Montgomery | 346/33 C X |

Primary Examiner—Joseph W. Hartary
Attorney—Andrew L. Gaboriault et al.

[57] ABSTRACT

Multiplexed seismic data representing a plurality of seismic channels intensity modulates each sweep of the electron beam on a cathode-ray tube. Each successive sweep of the electron beam is photographically reproduced on a rotating drum plotter to provide a plurality of seismic traces. Timing lines are recorded at fixed time intervals along the length of the seismic traces as they are recorded on the drum plotter. A generator provides timing number signals for selected timing lines to intensity modulate the electron beam on the cathode-ray tube so that timing numbers are photographically reproduced adjacent the selected timing lines.

6 Claims, 11 Drawing Figures

3,714,663

TIMING NUMBER GENERATOR

BACKGROUND OF THE INVENTION

Seismic data representing a plurality of seismic channels is conventionally digitized and stored on magnetic tape for further data processing. In one such data processing operation, the information stored on the magnetic tape is used to modulate a cathode-ray tube so as to display the information on the face of the cathode-ray tube. Such display can then be photographically reproduced by means of a conventional drum plotter. The photographic reproduction obtained is a series of traces, one such trace for each seismic channel, recorded in a parallel relationship. In such data processing operations, the digitized seismic data stored on magnetic tape is converted to seismic analog signals. These analog signals are then multiplexed so as to provide intensity-modulation pulses for application to the electron beam of a cathode-ray tube as it sweeps across the face of the display. One intensity-modulation pulse is provided during each sweep of the electron beam for each of the seismic channels. Rotation of the drum plotter past the face of the cathode-ray tube results in each sweep of the electron beam being recorded on the drum plotter in a position displaced from the previous sweep, resulting therefore in a series of seismic trace recordings on the photographic material surrounding the drum plotter. Timing lines are produced on the photographic material at fixed time intervals along the length of the seismic trace recordings. It has been the common practice to designate the timing lines by manually marking or otherwise fixing by tape or other means timing numbers adjacent to the timing lines after the seismic trace recordings have been photographically reproduced.

SUMMARY OF THE INVENTION

The present invention is directed to a method and apparatus by which timing lines along the length of the seismic trace recording can be identified by timing numbers photographically produced on the seismic trace recording adjacent the timing lines. In this aspect, there is provided a generator for providing a plurality of timing number signals during selected sweeps of the electron beam across the face of the cathode-ray tube. The timing number signals modulate the electron beam during those selected sweeps required to produce the timing numbers adjacent the fixed timing lines along the seismic trace recording.

More particularly, there is provided a first counter for counting the number of timing lines produced on the seismic trace recording. The counter provides a plurality of count pulses representing the number of timing lines counted. There is further provided a second counter for counting the sweeps of the electron beam. This counter provides a plurality of sweep pulses during those sweeps for which the electron beam is to be modulated for the production of a timing number on the seismic trace recording. A shift register provides a plurality of successive timing pulses defining those periods of each sweep of the electron beam during which timing numbers are to be reproduced. A plurality of gates are selectively coupled to the first and second counters and to the shift register for providing timing number signals for the intensity modulation of the electron beam. These timing number signals are produced in timed coincidence with the presence of the selective combination of timing pulses from the shift register and sweep counts from the second counter necessary to intensity modulate the electron beam for the production of the seismic trace recording of the timing number indicated by the count pulses of the first counter.

In accordance with another aspect of the invention, the timing number is produced on the seismic trace recording in block form by modulation of successive sweeps of the electron beam to trace out one or more of the following mutually perpendicular or parallel lines on the recording:

A. A horizontal line representing a top portion, a middle portion, or a bottom portion of the number.

B. A vertical line representing the entire left side, the top-half of the left side, or the bottom-half of the left side of the number.

C. A vertical line representing the entire right side, the top-half of the right side, or the bottom-half of the right side of the number.

In accordance with a more specific embodiment of the invention, a unit counter provides a plurality of count pulses representative of the unit numeral of the number of timing lines counted by the unit counter. A tenths counter provides a plurality of count pulses representative of the tenths numeral of the number of timing lines counted by the tenths counter. A shift register provides a series of successive timing pulses at the time during the sweep of the electron beam at which the intensity modulation of the electron beam is to be started for the production of the unit numeral of the timing number on the seismic trace recording and also for representing the time during the sweep of the electron beam at which the intensity modulation of the electron beam is to be started for the production of the tenths numeral of the timing number on the seismic trace recording.

In a further aspect of the invention, the shift register provides an additional timing pulse at the time during the sweep of the electron beam at which the intensity modulation of the electron beam is to be started for the production of a decimal point at a location on the recording between the unit numeral and the tenths numeral.

In still a further aspect of the invention, the recording of the timing numbers may be delayed by a preselected number of timing lines so that the first timing line to be marked with a timing number is other than the first timing line generated. Further, the densities of the timing lines generated are such that the first timing line marked with a timing number and every 1-second timing line thereafter are of one density, every 100-millisecond timing line generated between such 1-second timing lines is of a second density, and every 10-millisecond timing line generated between such 100-millisecond timing lines is of a third density.

DESCRIPTION OF THE PREFERRED EMBODIMENT

Figure 1:
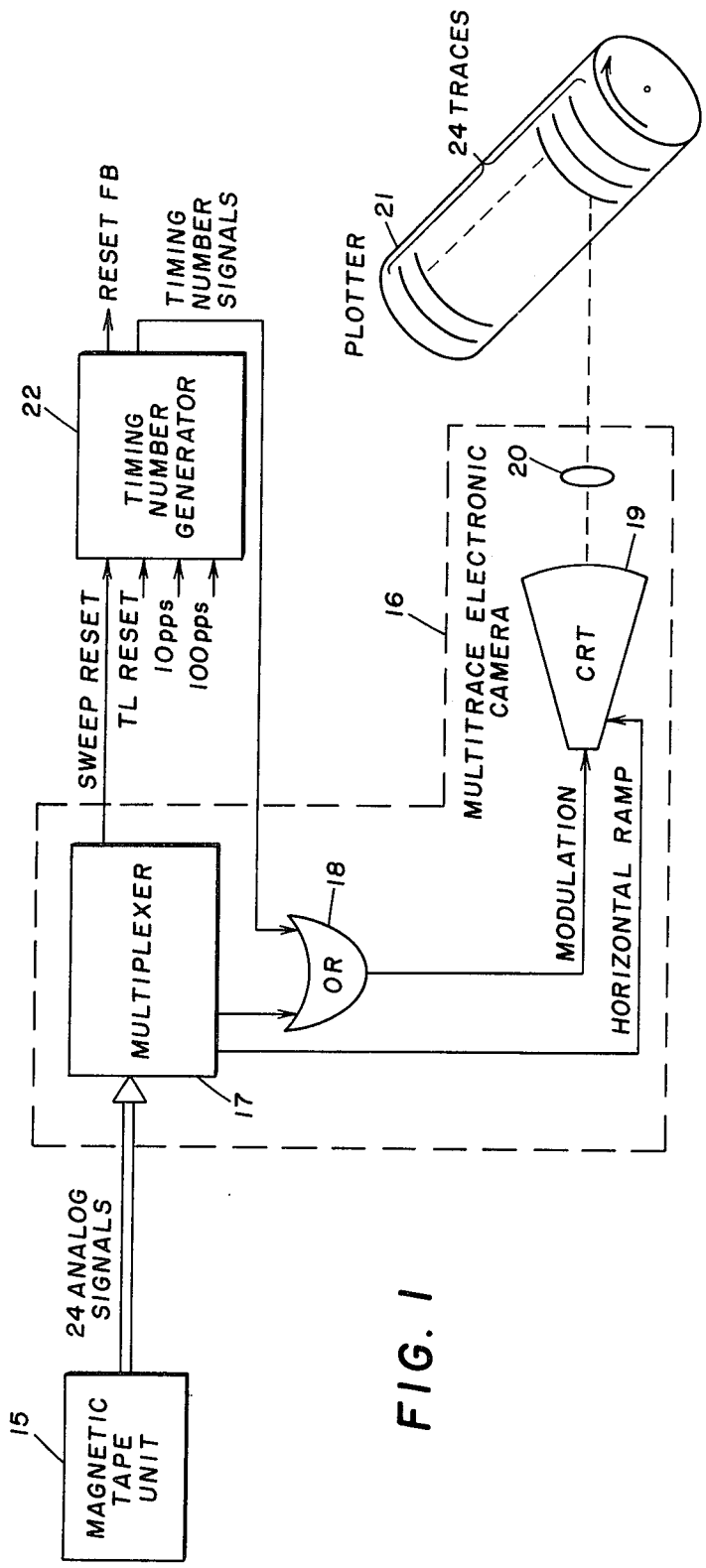
FIG. 1 is a block diagram schematic of one embodiment of the present invention.

Referring to FIG. 1, there is shown in block diagram one system embodying the present invention. A magnetic tape unit 15 converts seismic data representing, for example, 24 digitized seismic channels to 24 seismic analog signals. These seismic analog signals are applied to a multitrace electronic camera 16. Multitrace electronic camera 16 comprises a multiplexer 17, an OR gate 18, a cathode-ray tube 19, and a lens 20. The multiplexer accepts and converts the 24 channels of seismic analog signals to multiplexed seismic data. The multiplexed data is then applied by way of OR gate 18 to cathode-ray tube 19 for intensity modulation of the electron beam. Multiplexer 17 also supplies to the cathode-ray tube a horizontal ramp signal for controlling the sweep of the electron beam across the face of the cathode-ray tube. The multiplexed data successively intensity modulates the electron beam one time during each sweep of the electron beam across the face of the cathode-ray tube for each of the 24 seismic channels. The display on the face of the cathode-ray tube is focused by lens 20 onto a plotter 21. Plotter 21 comprises a rotatable drum around which is placed a photosensitive film or paper on which is recorded in a side-by-side relationship each successive sweep of the electron beam on the face of the cathode-ray tube 19.

Figure 2:
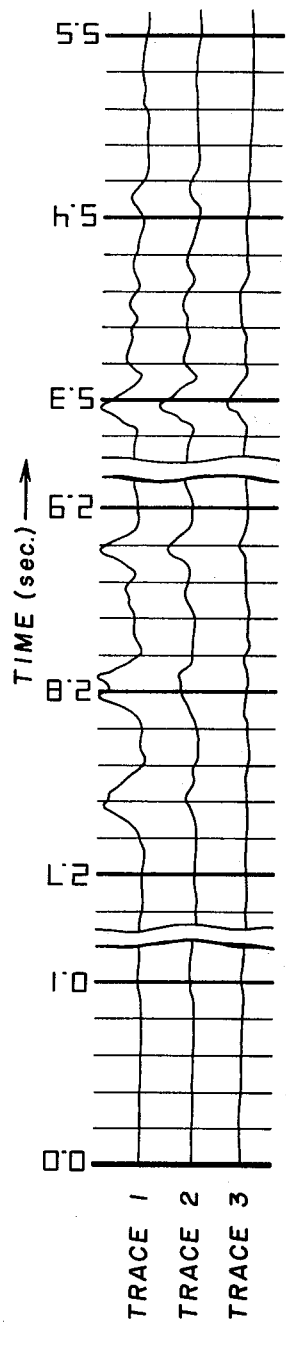
FIG. 2 illustrates three seismic traces reproduced by the embodiment of the present invention.

As a specific feature of the present invention, there is provided a timing number generator 22 which allows every 100 milliseconds of recording on the plotter 16 to be marked by a timing number adjacent to the 100-millisecond timing line. FIG. 2 represents the reproduction of, for example, three seismic traces on a 5.5-second photographic record. The 100-millisecond timing lines illustrates in FIG. 2 occur at 0.0, 0.1, 2.7, 2.8, 2.9, 5.3, 5.4, and 5.5 seconds.

Figure 3:
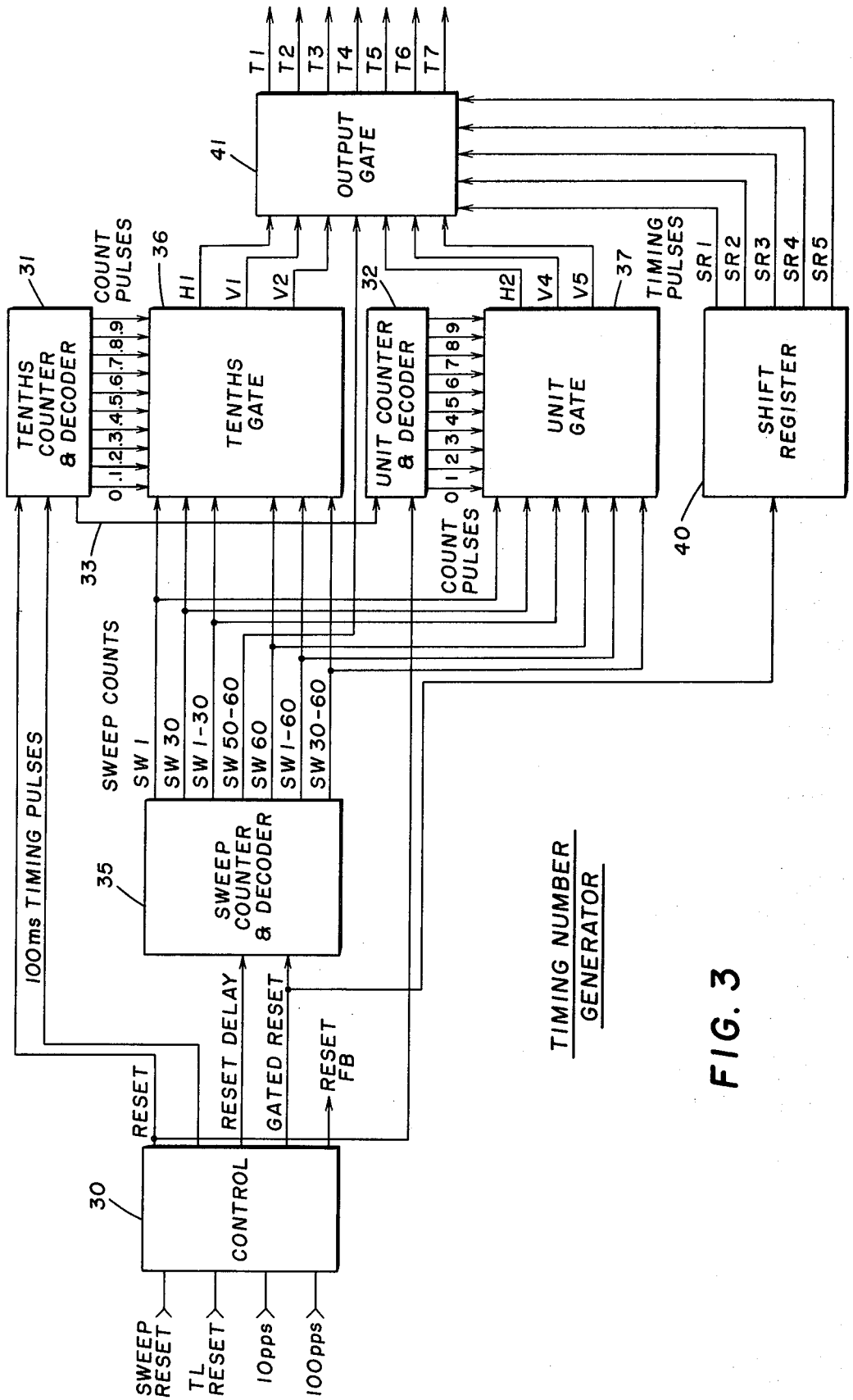
FIG. 3 is a block diagram schematic of a portion of FIG. 1.

Referring now to FIG. 3, there is illustrated in block diagram form the units comprising the timing number generator 22. The timing number generator has four inputs: sweep reset, TL reset signal, 10-PPS signal, and 100-PPS signal. The sweep reset is a pulse produced by the multiplexer 17 at the beginning of each horizontal ramp signal. The 10-PPS signal is the output of the timing line generator in the plotter 21. The TL reset signal is a timing line reset signal from the plotter 21 which is synchronized with the rotation of the plotter drum. The 100-PPS signal is a pulse generated by the plotter approximately 10 microseconds prior to the TL reset signal. These four input signals are utilized by the control unit 30 to control the operation of the other units of the timing number generator.

Control unit 30 supplies 100-millisecond timing pulses to a tenths counter and decoder 31. An output of the tenths counter 31 is applied by way of line 33 to the input of the unit counter and decoder 32. For every 10 counts recorded by the tenths counter 31, one pulse is applied by way of line 33 to the unit counter 32. The decoder portions of each of these two units 31 and 32 are binary-coded decimal-to-decimal converters. The outputs of the unit counter and decoder 32 are 10 count pulses 0 through 9 and represent the unit numeral of the number of 100-millisecond timing pulses from the control unit 30. The outputs of the tenths counter and decoder 31 are 10 count pulses 0 through 0.9 and represent the tenths numeral of the number of 100-millisecond timing pulses from the control unit 30.

A sweep counter and decoder 35 is provided to count the number of sweeps of the electron beam across the face of the cathode-ray tube. For each sweep reset pulse from multiplexer 17, the control unit 30 supplies a reset delay signal and a gated reset signal to the sweep counter and decoder 35. This unit provides seven sweep count outputs beginning with the first sweep after each 100-millisecond timing pulse. The sweep count signals designated SW 1, SW 30, and SW 60 are provided during the 1st, 30th, and 60th sweeps, respectively, following each of the 100-millisecond timing pulses. The sweep counts SW 1–30, SW 50–60, Sw 1–60, and SW 30–60 are provided for the durations of the 1st through the 30th, the 50th through the 60th, the 1st through the 60th, and the 30th through the 60th sweeps, respectively, following each of the 100-millisecond timing pulses. Each of these seven sweep count pulses, with the exception of the SW 50–60 pulse, is applied to tenths gate 36 and unit gate 37. The SW 50–60 pulse is applied to an output gate 41.

The tenths gate 36 and unit gate 37 gate the count pulses from the tenths counter and decoder 31 and the unit counter and decoder 32, respectively, with the sweep counts from the sweep counter and decoder 35 to provide two horizontal and four vertical signals designated as H1, V1, V2, H2, V4, and V5. These two horizontal and four vertical signals are gated by an output gate 41 with the five timing pulses SR1–SR5 from a shift register 40 to provide seven timing number signals T1–T7. These seven timing number signals are applied to the cathode-ray tube during the timing periods initiated by the timing pulses SR1–SR5 to intensity modulate the electron beam at the appropriate time during those sweeps of the electron beam necessary for the production of the timing number of the seismic trace recording.

The shift register 40 is triggered by the gated reset signal from control unit 30 to provide the five timing pulses SR1–SR5. The five timing pulses form a timing chain in which each timing pulse is begun upon the termination of the preceding timing pulse. That is, timing pulse SR2 is begun at the termination of timing pulse SR1, and timing pulse SR3 is begun at the termination of timing pulse SR2, etc. The shift register 40 provides a delay after each gated reset pulse of approximately 220 microseconds before the generation of the first timing pulse SR1.

Figure 4:
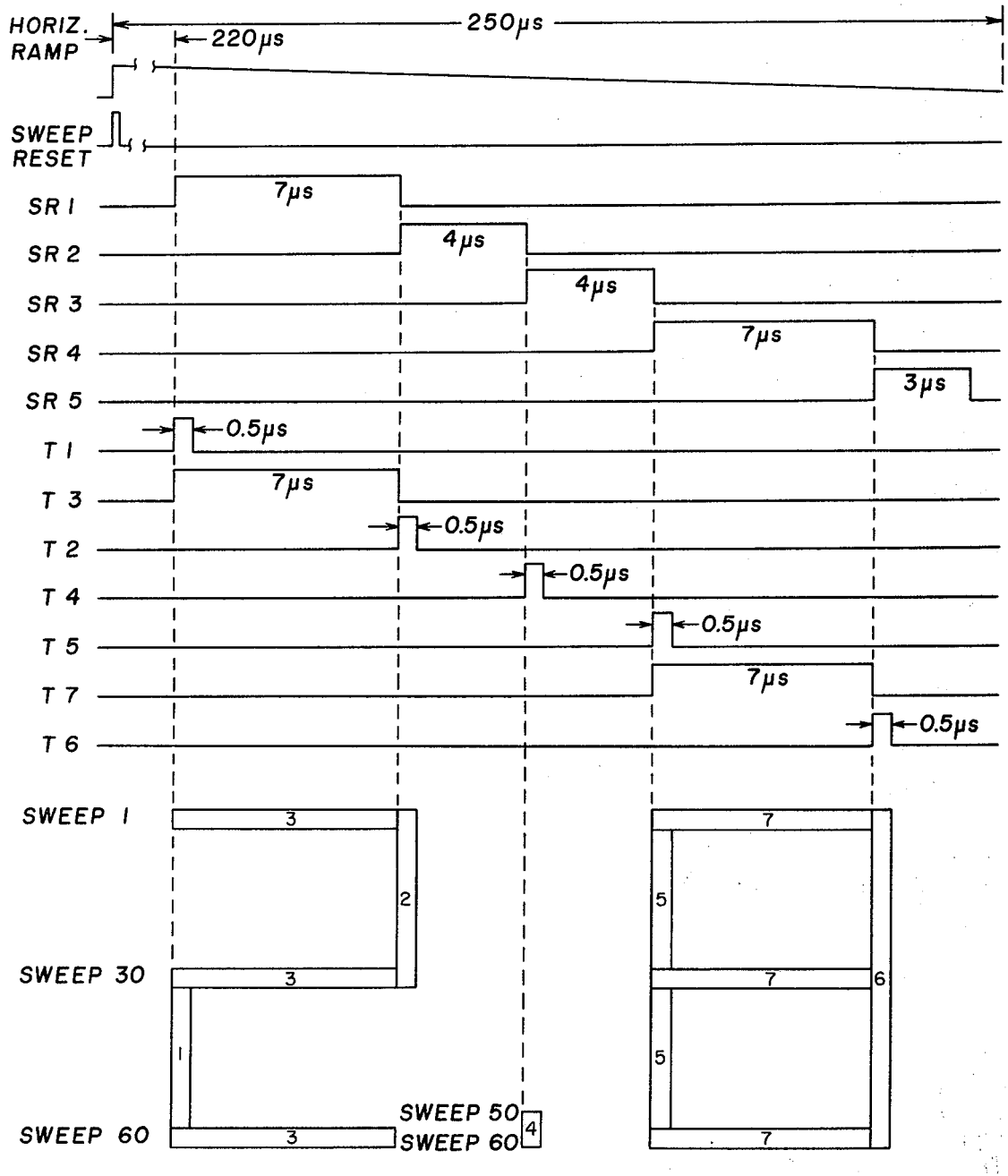
FIGS. 4 and 7 are a series of waveforms representative of signals appearing at the indicated points in the schematic of FIG. 3.
Figure 5:
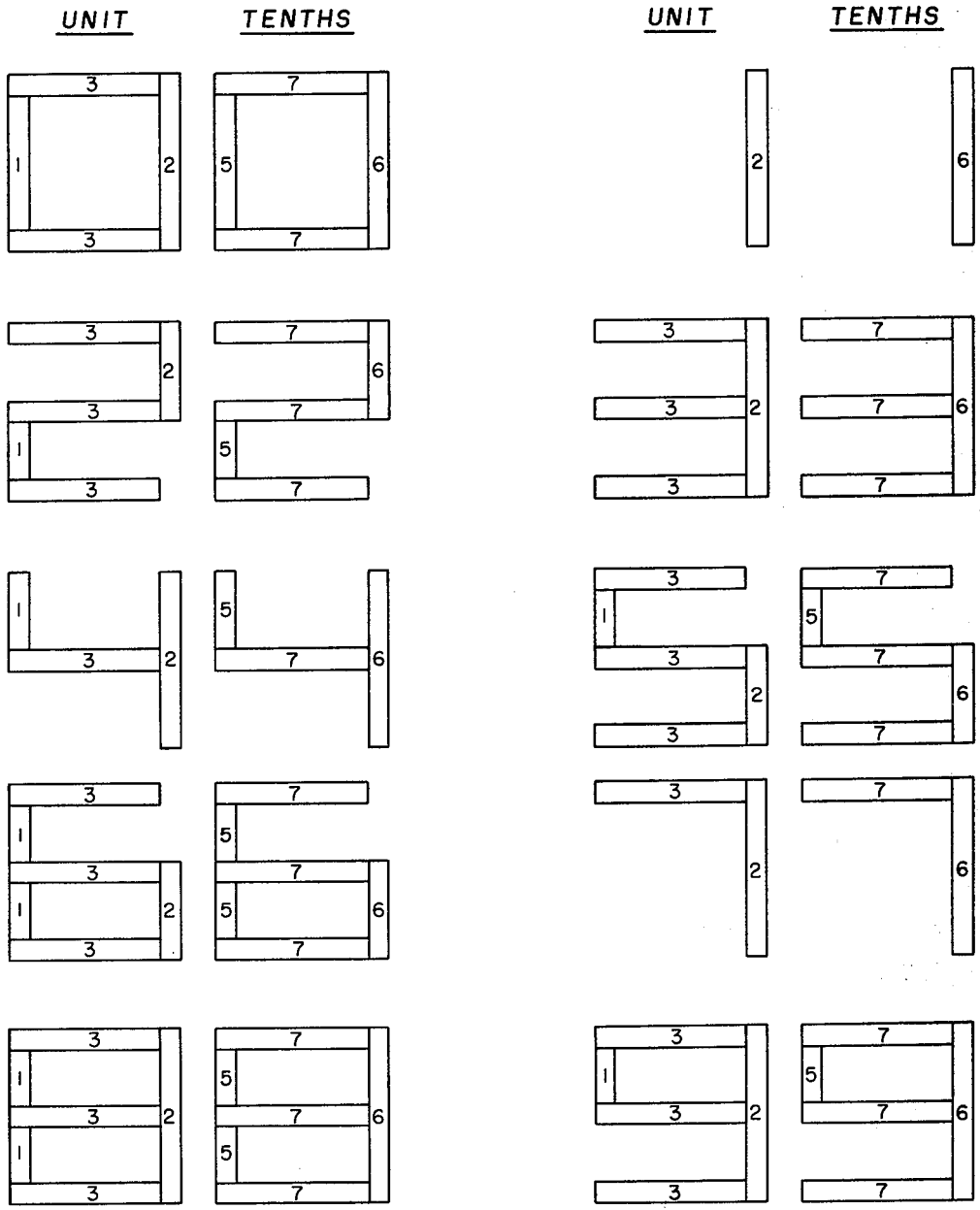
FIG. 5 designates those waveforms of FIG. 4 utilized to display the numerals 0–9.

Having broadly described the operation of the timing number generator 22 in conjunction with the block diagram schematic in FIG. 3, a more detailed understanding of the operation of the timing number generator and the generation of the timing number signals T1–T7 may be had by reference to the following description taken in conjunction with FIGS. 4 and 5 which illustrate the foregoing-described signals and their timing relationships with respect to each other.

In the embodiment described herein, each sweep of the electron beam across the face of the cathode-ray tube is initiated by the horizontal ramp signal of 250-microsecond duration. During the first 220 microseconds, the electron beam is intensity modulated by information comprising data from the 24 seismic analog channels. During the last thirty microseconds of each horizontal ramp signal, the electron beam is intensity modulated with timing number information from the timing number generator 22. The timing number is formed on the seismic trace recording by the intensity modulation of, for example, 60 successive sweeps of the electron beam. A sweep reset pulse is provided by the multiplexer 7 at the start of each horizontal ramp signal. The sweep reset pulse is gated by the control unit 30 and applied as a gated reset pulse to the shift register 40. Shift register 40 provides the first timing pulse SR1 220 microseconds after the presence of the gated reset pulse. The five timing pulses SR1-SR5 are of durations of 7 microseconds, 4 microseconds, 4 microseconds, 7 microseconds, and 3 microseconds, respectively, each timing pulse beginning upon the termination of the preceding timing pulse, thereby forming a series of pulses in the form of a timing chain. These five timing pulses, when gated by output gate 41 with the horizontal and vertical signals H1, V1, V2, H2, V4, and V5 and the sweep count signal SW 50–60, provide for the seven timing number signals T1–T7.

Timing number signals T1, T2, T4, T5, and T6 are each 0.5-microsecond pulses initiated in timed coincidence with the leading edge of timing pulses SR1, SR2, SR3, SR4, and SR5, respectively. Timing number signals T3 and T7 are each 7-microsecond pulses, T3 being in timed coincidence with the timing pulse SR1 and T7 being in timed coincidence with the timing pulse SR4. The presence of any one or more of these seven timing number signals during each sweep of the electron beam is dependent upon the timing number to be produced. Any two-digit number and decimal point can be produced on the seismic trace recording in block letter form by the proper gating of these seven timing number signals. Take, for example, the timing number 2.8 seconds as illustrated in FIG. 4. The number 2.8 is produced in block letter form by appropriately gating the seven timing number pulses T1–T7 ON and OFF during, for example, 60 sweeps of the electron beam. The unit numeral 2 is partially produced by a horizontal bar at the top, middle, and bottom portions of the numeral as designated by the legend 3. To produce these three horizontal bars on the seismic trace recording, the electron beam is turned ON by timing number signal T3 for a period of 7 microseconds during each of sweeps 1, 30, and 60. The upper right-hand portion of the numeral 2 is a vertical bar designated by the legend 2 and is produced by intensity modulating the electron beam for the 0.5-microsecond period of the timing number signal T2 during sweeps 1–30. Similarly, the lower left-hand portion of the numeral 2 is a vertical bar designated by the legend 1 and is produced by modulation of the electron beam during the 0.5-microsecond period of timing number signal T1 during each of sweeps 30–60. The tenths numeral 8 is partially produced by three horizontal bars as designated by the legend 7. These bars are formed by gating the timing number signal T7 ON during sweeps 1, 30, and 60. The left-hand portion of the numeral is a vertical bar designated by the legend 5 and is produced by gating the T5 pulse ON during sweeps 1–60. The right-hand portion of the numeral 8 is a vertical bar designated by the legend 6 and is produced by gating the timing number signal T6 ON during sweeps 1–60. A decimal point between the numerals 2 and 8 is designated by the legend 4 and is produced by gating the timing number signal T4 ON during sweeps 50–60. Any numeral from 0 through 9 can similarly be written in block letter form by the proper combination of horizontal and vertical bars. Reference to FIG. 5 indicates by legends those combinations of timing number signals necessary to produce the numerals 0 through 9 in both the unit and tenths form.

The operation of the timing number generator as represented by the units set forth in FIG. 3 and as described with reference to the various signals and timing pulses as shown in FIGS. 4 and 5 may be more fully understood by reference to the detailed description and operation of each of the units of the timing number generator as illustrated in FIGS. 6–11.

Sweep Counter and Decoder

Figure 6:
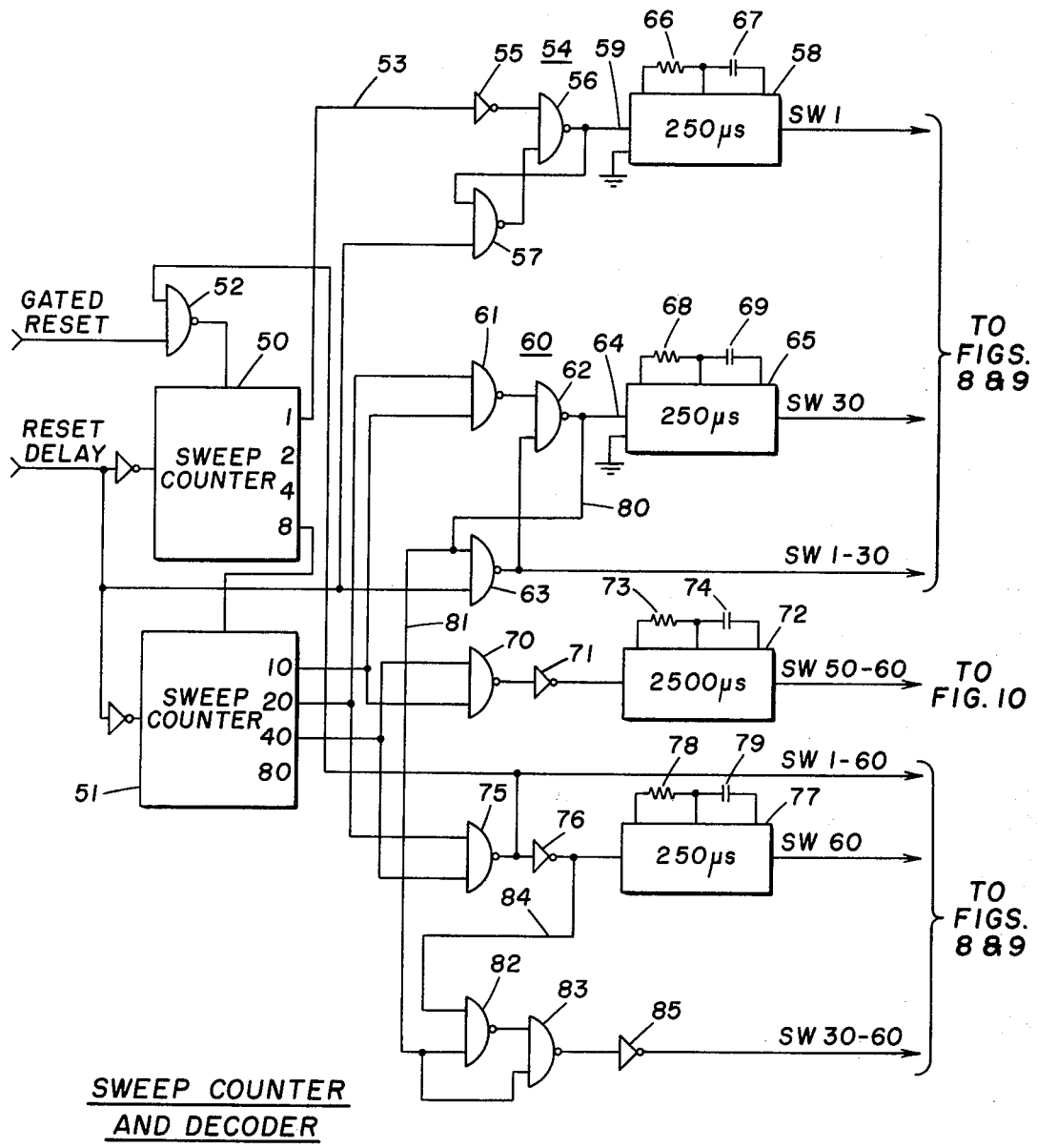
FIG. 6 and FIGS. 8-11 are circuit schematics of FIG. 3.
Figure 7:
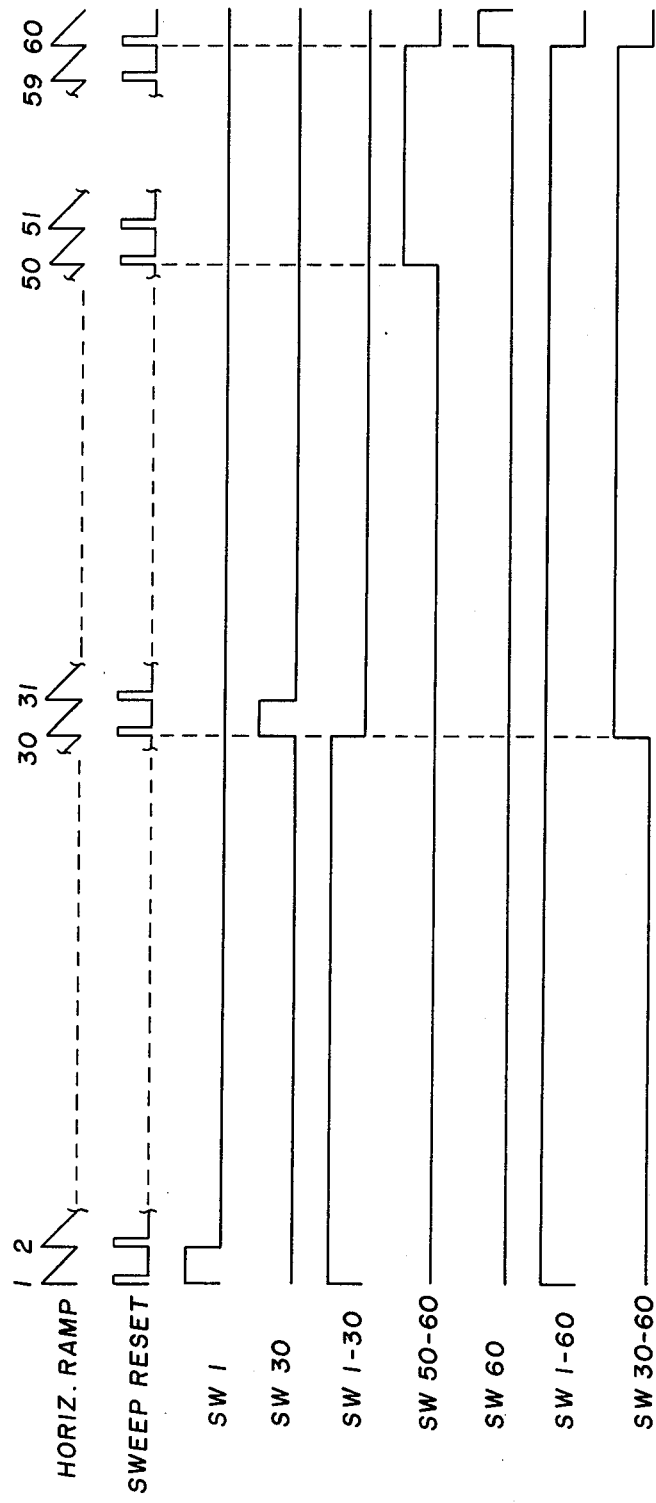

The sweep counter and decoder 35 is set forth in FIG. 6. The seven sweep count signals from sweep counter and decoder 35 are shown in time relationship with 60 corresponding horizontal ramp signals and sweep reset signals in FIG. 7.

The reset delay signal from control unit 30 is applied to the input of both sweep counters 50 and 51 to reset the count to 0 prior to the production of a timing number. The gated reset pulse is coupled by gate 52 to sweep counter 50. The gated reset pulse is provided at the start of each sweep of the electron beam.

Sweep count SW 1 is the output of one-shot multivibrator 58. At the count of the first sweep of the electron beam, a true pulse is applied by way of line 53 to a latch circuit 54 comprised of inverter 55, gate 56, and gate 57. The latch is set at the count of 1 to a true output on line 59 for the firing of one-shot multivibrator 58. Sweep pulse SW 1 is positive for the 250-microsecond duration of the first sweep of the electron beam.

Sweep count SW 30 is the output of one-shot multivibrator 65. The count 8 output from sweep counter 50 is coupled as the count input to sweep counter 51. Upon the count of 30, latch 60, comprised of gate 61, gate 62, and gate 63, is set to provide a true output on line 64. This true output triggers one-shot multivibrator 65 to provide a 250-microsecond positive pulse on output line SW 30. SW 30 therefore remains positive for the 250-microsecond period of the 30th sweep.

Sweep count SW 1–30 is the output of gate 63. At the count of 30, gate 63 is set to a false output. Sweep count SW 1–30 is a positive pulse until the 30th sweep, at which time it becomes negative.

Sweep count SW 50–60 is the output of one-shot multivibrator 72. At the count of 50, gate 70 is set to a false output which is coupled by way of inverter 71 as a true input to one-shot multivibrator 72. One-shot multivibrator 72 provides a 2.5-millisecond positive sweep pulse SW 50–60.

Sweep count SW 1-60 is the output of gate 75. Upon the count of 60, gate 75 is set to a false output. Sweep signal SW 1-60 is therefore a positive signal until the 60th sweep, during which it becomes negative.

Sweep count SW 60 is the output of one-shot multivibrator 77. The output of gate 75 is coupled by inverter 76 to the input of one-shot multivibrator 77. At the count of 60, one-shot multivibrator 77 is fired to provide a positive sweep pulse SW 60 for a period of 250 microseconds, this period corresponding to the duration of the 60th sweep.

Sweep count SW 30-60 is the output of inverter 85. The output of latch 60 is connected by lines 80 and 81 to one input of both gates 82 and 83. The output of gate 76 is connected by line 84 to a second input of gate 82. The output of gate 82 is the second input to gate 83. The output of gate 83 is the input to inverter 85. The output of inverter 85 provides a positive pulse SW 30-60 for the duration of sweeps 30-60.

The output of gate 75 is also connected to the input of gate 52 to stop the transfer of gated reset pulses to sweep counter 50 following the count of 60 until the next timing number is to be written, at which time another reset delay will be generated to reset the sweep counters 50 and 51.

As had been previously noted, the seven sweep count signals are applied to both the tenths gate 36 and unit gate 37 for selective coupling to the outputs of tenths counter and decoder 31 and unit counter and decoder 32, respectively.

Tenths and Unit Counters, Decoders, and Gates

Figure 8:
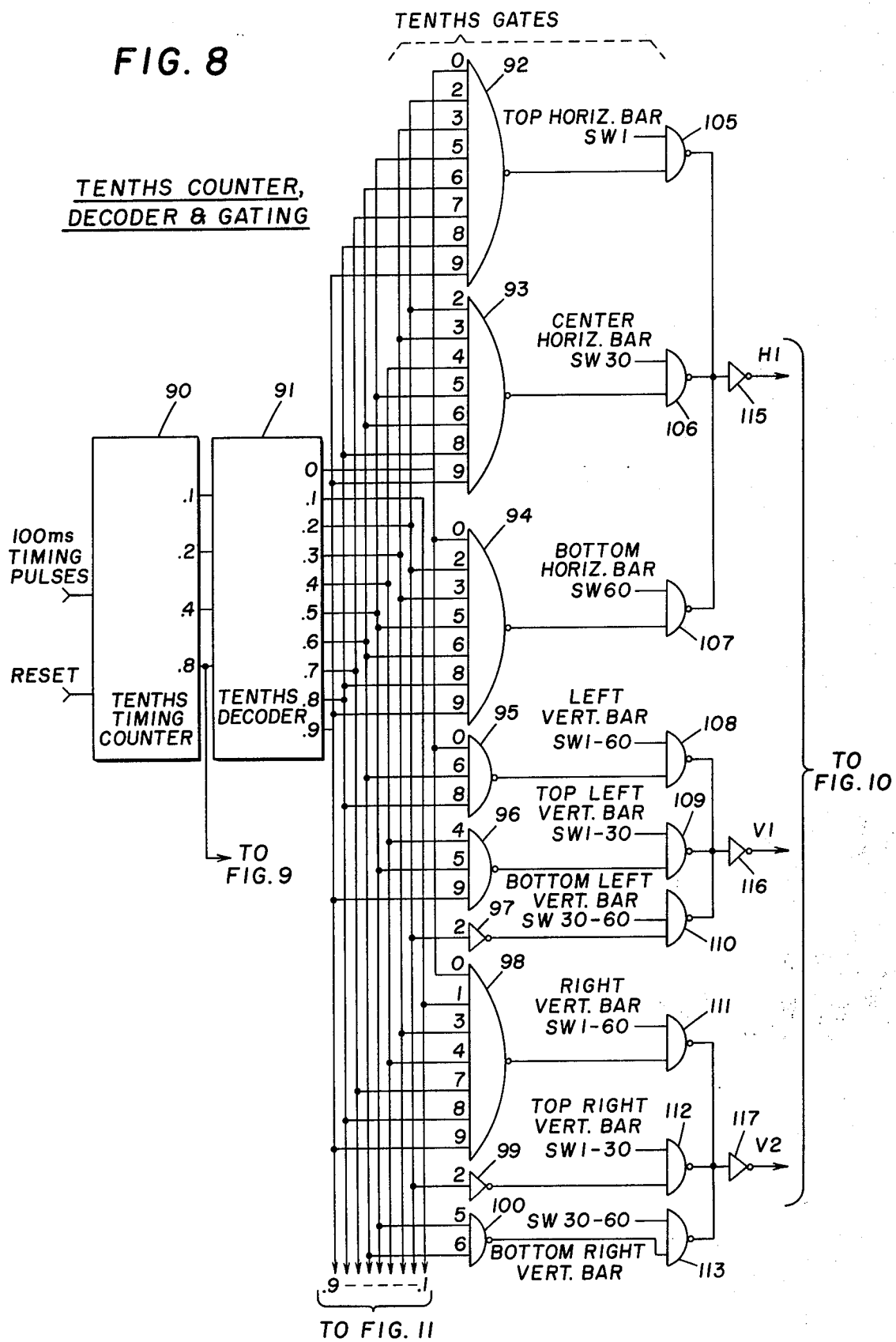
Figure 9:
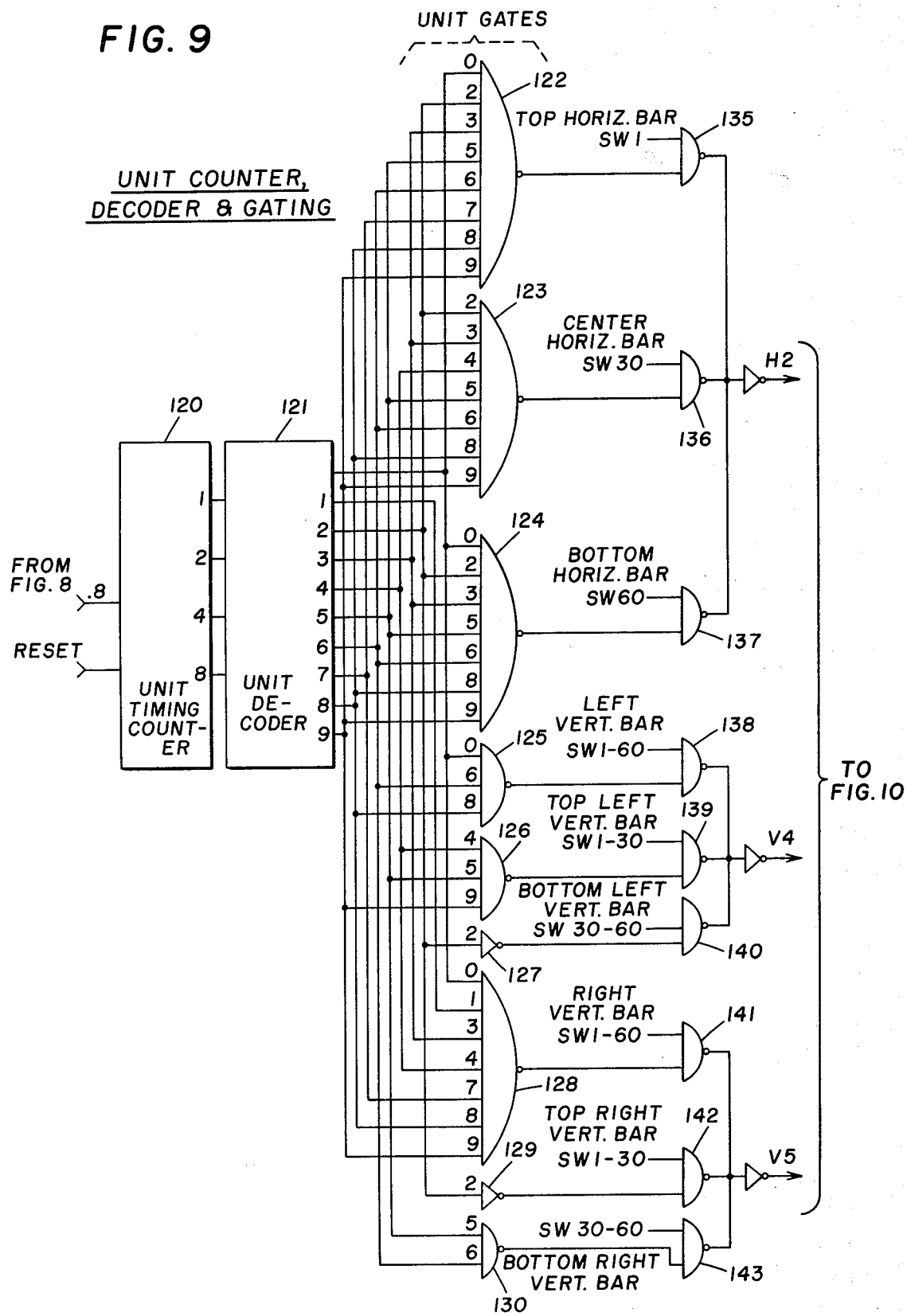

FIG. 8 illustrates the tenths counter and decoder 31 and the tenths gate 36. FIG. 9 represents the unit counter and decoder 32 and the unit gate 37. The tenths circuitry and unit circuitry are identical in configuration and operation. Therefore, only the tenths circuitry as set forth in FIG. 8 will be discussed in detail.

The 100-millisecond timing pulses from control unit 30 are applied to a tenths timing counter 90. The count of the tenths timing counter 90 is decoded by the tenths decoder 91 to provide an output which is updated with every 100-millisecond timing pulse. The ten outputs of the tenths decoder 91 are selectively coupled to a series of tenths gates 92-100. The inputs to tenths gate 92 are coupled to those outputs of the tenths decoder 91 which represent tenths numerals that can be partially represented in block letter form by a horizontal bar across the top of the numeral, these numerals being 0, 2, 3, 5, 6, 7, 8, and 9. The output line of tenths decoder 91 which represents the number of timing pulses counted will be a false output. All other outputs will be true. For example, after a reset pulse is applied to tenths timing counter 90 from control unit 30, the third timing pulse counted will cause tenths decoder 91 to provide a false output on the 0.3 output line. All other outputs of tenths decoder 91 will be true. A false signal on any one of the inputs to gate 92 will cause the output of gate 92 to be true. Therefore, at the counts of 0, .2, .3, .5, .6, .7, .8, and .9, tenths gate 92 will be true. The output of gate 92 is coupled as one input to a gate 105. The sweep count SW 1 signal from sweep counter and decoder 35 is applied as a second input to gate 105. Since sweep count SW 1 is a 250-microsecond pulse lasting for the duration of the first sweep of the electron beam across the face of the cathode-ray tube, the output of gate 105 will be true during such sweep whenever the tenths numeral to be written on the face of the cathode-ray tube is either a 0, 2, 3, 5, 6, 7, 8, or 9.

In similar fashion to the operation of tenths gate 92 and top horizontal bar gate 105, the tenths gate 93 is coupled to those tenths decoder 91 outputs which are false when the tenths numeral to be displayed on the face of the cathode-ray tube is a 2, 3, 4, 5, 6, 8, or 9. The output of tenths gate 93 is applied as one input to center horizontal bar gate 106. Upon application of the sweep count SW 30 signal as a second input to gate 106, a true signal appears at the output of gate 106 for the 250-microsecond period of the SW 30 sweep. Similarly, tenths gate 94 and bottom horizontal bar gate 107 provide for a true signal on the output of gate 107 during the 250-microsecond period of the sweep count SW 60 signal whenever the tenths numeral to be displayed on the face of the cathode-ray tube is either a 0, 2, 3, 5, 6, 8, or 9. The outputs of gates 105, 106, and 107 are applied by inverter 115 as the horizontal signal H1 to output gate 41. The horizontal signal H1 will be true for a 250-microsecond period whenever the tenths numeral to be displayed on the face of the oscilloscope requires a top horizontal bar, a center horizontal bar, or a bottom horizontal bar.

Gates 95-97 and gates 108-110 combine in operation to provide a vertical signal V1 to output gate 41 whenever the tenths numeral to be produced is partially described by a vertical bar on the left side of the character. Gate 108 supplies a true signal for the entire duration of sweeps 1-60 whenever the tenths numerals 0, 6, or 8 are to be displayed. Gate 109 provides a top left vertical bar signal for the durations of sweeps 1-30 when the tenths numeral to be displayed is 4, 5, or 9. Gate 110 provides a bottom left vertical bar signal for the duration of sweeps 30-60 when the tenths numeral to be displayed is a 2.

Gates 98-100 and gates 111-113 combine to provide a vertical signal V2 to output gate 41 when the tenths numeral to be displayed is partially described by a vertical bar on the right-hand side of the numeral. For example, gate 111 provides a right vertical bar signal for the duration of sweeps 1-60 when the numeral to be displayed is either a 0, 1, 3, 4, 5, 7, 8, or 9. Gate 112 provides a top right vertical bar signal for the duration of sweeps 1-30 when the numeral to be displayed is a 2. Gate 113 provides a bottom right vertical bar signal for the duration of sweeps 30-60 when the numerals to be displayed are either a 5 or a 6.

To summarize the operation of tenths counter and decoder 31 and tenths gate 36 of FIG. 8, the horizontal H1 output will be true for the 250-microsecond period of sweep 1 if a top horizontal bar is to be produced, for the 250-microsecond period of sweep 30 if a center horizontal bar is to be produced, and for the 250-microsecond period of sweep 60 is the bottom horizontal bar is to be produced. Vertical signal V1 will be true for the entire duration of sweeps 1-60 if a left vertical bar is to be produced down the entire left side of the character, for the duration of sweeps 1-30 if a top left vertical bar is to be produced, and for the duration of sweeps 30-60 if a bottom left vertical bar is to be produced. Vertical signal V2 will be true for the entire duration of sweeps 1-60 if a right vertical bar is to be produced down the entire right side of the digit numeral, for the duration of sweeps 1-30 if a top right vertical bar is to be produced, and for the duration of sweeps 30-60 if a bottom right vertical bar is to be produced.

The unit counter and decoder 32 and unit gate 37 illustrated in FIG. 9 is of identical configuration and operation with the tenths counter and decoder 31 and tenths gate 36 and, as previously noted, will not be described in detail. Input to the unit timing counter 120 is supplied by the output in the last stage of the tenths timing counter 90. Unit decoder 121 decodes the output of unit timing counter 120 to provide an output representative of the unit numeral of the number of timing lines counted. Unit gates 122-124 and gates 135-137 provide a horizontal signal H2 when the unit numeral to be produced is partially described by a top horizontal bar, a center horizontal bar, or a bottom horizontal bar. Gates 125-127 and gates 138-140 combine to provide a vertical signal V4 when the unit numeral to be produced is partially described by a left vertical bar down the entire left side of the numeral, by top left vertical bar, or a bottom left vertical bar. Similarly, gates 128-130 and gates 141-143 provide a vertical signal V5 when the unit numeral to be displayed is partially described by a right vertical bar down the entire right side of the numeral, or by a top right vertical bar, or by a bottom right vertical bar.

Shift Register

Figure 10:
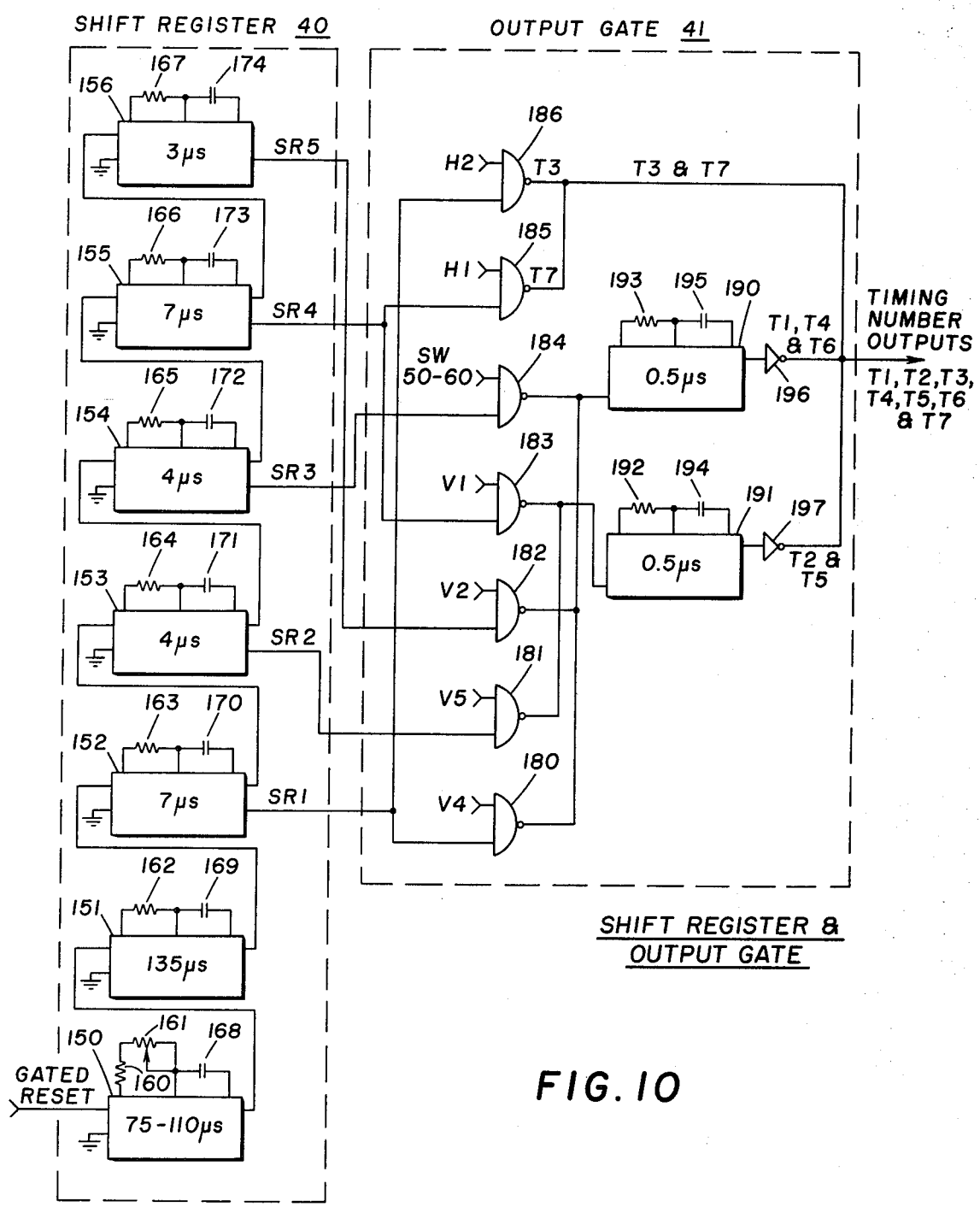
Figure 11:
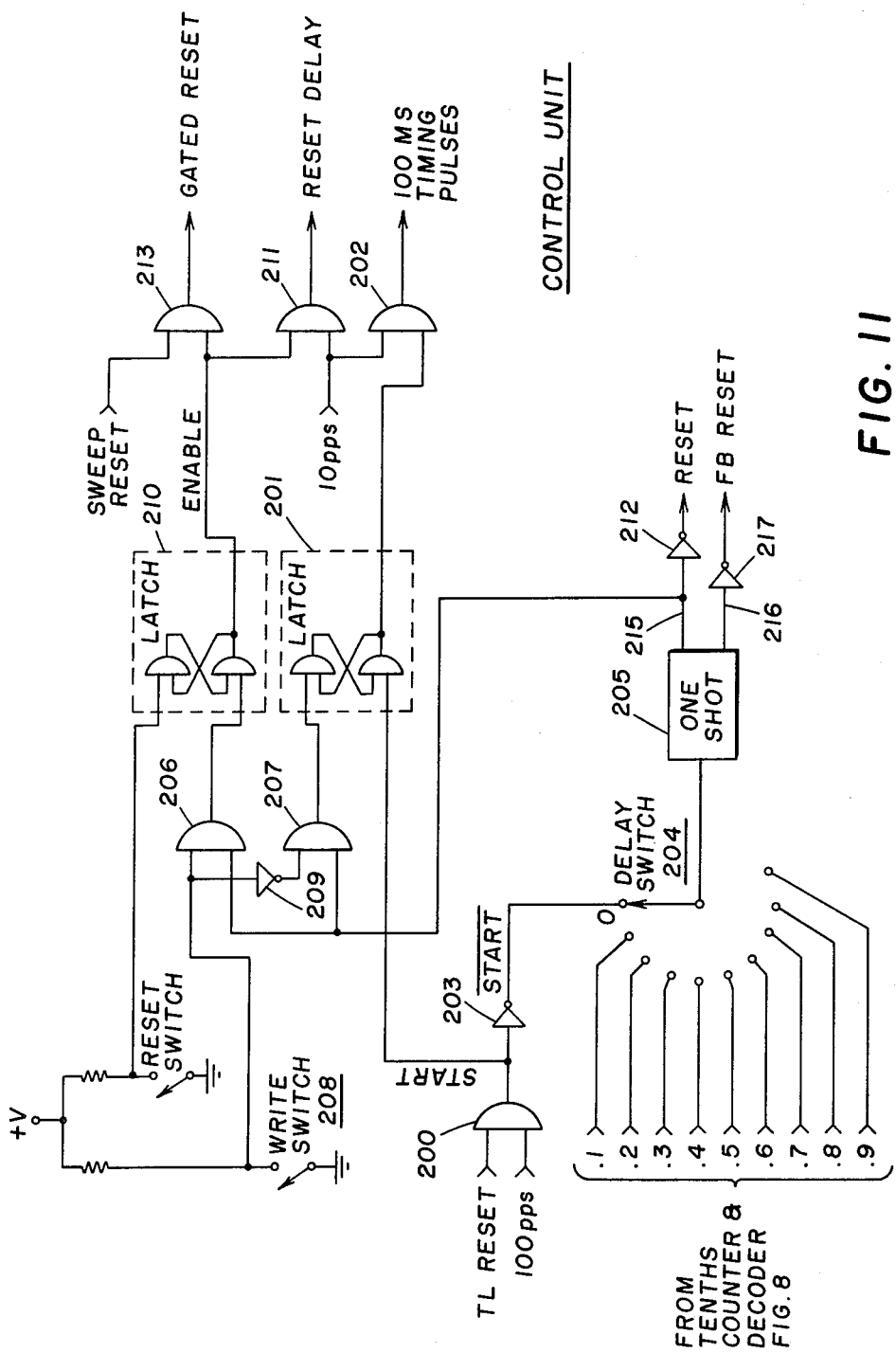

FIG. 10 illustrates the circuitry of the shift register 40. The shift register 40 includes a series of one-shot multivibrators 150-156. The trailing edge of the output of each of the one-shot multivibrators triggers the next one-shot multivibrator. The input to shift register 150 is the gated reset signal from control unit 30 which is provided at the start of each sweep of the electron beam. Bias control for one-shot multivibrators 150-156 is provided by resistors 160-167 and capacitors 168-174. The period of one-shot multivibrator 150 is variable from 75 microseconds to 110 microseconds by means of variable resistor 161. The period of one-shot multivibrator 151 is fixed at 135 microseconds. In the preferred embodiment, the period of one-shot multivibrator 150 is adjusted to 85 microseconds. At the end of this 85-microsecond period, the trailing edge of the output pulse from one-shot multivibrator 150 triggers one-shot multivibrator 151 for a period of 135 microseconds. The total time period of one-shot multivibrators 150 and 151 is 220 microseconds. This 220-microsecond period is the period during which the electron beam is intensity modulated to display seismic data on the face of the cathode-ray tube. The remaining 30 microseconds of the 250-microsecond sweep period of the electron beam is used to produce the timing number on the seismic trace recording.

One-shot multivibrator 152 is triggered for a 7-microsecond period by the trailing edge of the output from one-shot multivibrator 151. The trailing edge of the 7-microsecond output signal from one-shot multivibrator 152 triggers one-shot multivibrator 157 for a 4-microsecond period. Similarly, one-shot multivibrators 154, 155, and 156 are triggered successively for periods of 4 microseconds, 7 microseconds, and 3 microseconds, respectively. These outputs of one-shot multivibrators 152-156 are designated as timing pulses SR1-SR5, respectively, and are illustrated in FIG. 4 in time perspective.

Output Gate

Output gate 41 selectively gates the five timing pulses SR1-SR5 with the horizontal signal H1 and vertical signals V1 and V2 from tenths gate 36; with the horizontal signal H2 and the vertical signals V4 and V5 from unit gate 37; and with the sweep count SW 50-60 signal from the sweep counter and decoder 35. This gating function is carried out by means of gates 180-186.

The timing pulse SR1 and the vertical signal V4 set gate 180 to a true output which triggers one-shot multivibrator 190 to provide the timing number signal T1 of 0.5-microsecond duration whenever the unit numeral of the timing number to be produced is partially described by a vertical bar down the top left, lower left, or entire left side of the unit numeral.

Timing pulse SR1 is also gated with the horizontal signal H2 from the unit gate 37 to set the gate 186 to a true output which triggers one-shot multivibrator to provide the timing number signal T3 of 7-microsecond duration whenever the unit numeral of the timing number to be produced is partially described by a horizontal bar across the top, middle, or lower portion of the unit numeral.

Timing pulse SR2 and vertical signal V5 set gate 181 to a true output which triggers one-shot multivibrator 191 to provide a timing number signal T2 of 0.5-microsecond duration whenever the unit portion of the timing number to be displayed can be partially described by a vertical bar down the top, lower, or entire right side of the unit numeral.

Timing pulse SR3 is utilized along with the sweep count signal SW 50-60 to cause a decimal point to be produced between the unit numeral and the tenths numeral. Timing count SR3 and sweep count SW 50-60 set gate 184 to a true output which triggers one-shot multivibrator 190 to provide a timing number signal T4 of 0.5-microsecond duration. Timing number signal T4 modulates the electron beam during sweeps 50-60 for a period of 0.5 microsecond beginning at the leading edge of the timing pulse SR3 as illustrated in FIG. 4.

Timing pulse SR4 and vertical signal V1 set gate 183 which triggers one-shot multivibrator 191 to provide a timing number signal T5 of 0.5-microsecond duration whenever the unit portion of the numeral is to be partially described by a vertical bar down the top, lower, or entire left side of the tenths numeral.

Timing count SR4 is also gated with the horizontal signal H1 by gate 185 to provide a timing number signal T7 of 7-microsecond duration whenever the tenths numeral can be partially described by a horizontal top, middle, or lower bar.

Timing pulse SR5 and vertical pulse V2 set gate 182 which triggers one-shot multivibrator 190 to provide a timing number signal T6 of 0.5-microsecond duration whenever the tenths portion of the timing numeral can be partially described by a vertical bar down the top, lower, or entire right side of the digit numeral.

Resistors 192 and 193 and capacitors 194 and 195 provide bias control for one-shot multivibrators 190 and 191. The outputs of one-shot multivibrators 190 and 191 are inverted by inverters 196 and 197. The outputs of gates 185 and 186 and inverters 196 and 197 are tied together in a wired OR function to provide a single output line for the seven timing number signals T1–T7.

Control

The TL reset signal is a timing line reset signal from the plotter 21 which is synchronized with the rotation of the plotter drum. The 100–PPS signal is generated by the plotter approximately 5 milliseconds after the TL reset signal. These two signals are applied to a gate 200. Upon the presence of these two signals, gate 200 provides a start signal to set latch 201. The output of latch 201 is coupled along with the 10–PPS signal to gate 202. Latch 201, when set by the start signal, permits gate 202 to pass the 10–PPS signal as the 100-millisecond timing pulses to the tenths counter and decoder 31.

The start signal is also connected to inverter 203 which in turn is connected to position 0 of the delay switch 204. Positions 1–9 of this switch are coupled to the 0.1 – 0.9 count outputs, respectively, of tenths counter and decoder 31. With the switch 204 set to position 0, the start signal is applied to one-shot 205.

One-shot 205 is fired by the start signal to provide two output signals, a logic "1" signal on line 215 and a logic "0" signal on line 216. The logic "1" on line 215 is inverted by inverter 212 and coupled as a reset signal for the tenths counter and decoder 31 and the unit counter and decoder 32. Line 215 is also connected to the inputs of gates 206 and 207. Also coupled to gates 206 and 207 is the output from write switch 208. Write switch 208 is closed when no timing numbers are to be recorded and open when timing lines are to be recorded. When closed, switch 208 applies a logic "0" to gate 206 and inverter 209. Invertor 209 applies a logic "1" to gate 207. The application of a logic "1" from inverter 209 and a logic "1" from one-shot 205 to both inputs of gate 207 enables gate 207 to reset latch 201. This resetting of latch 201 prevents gate 202 from providing 100-ms timing pulses.

When timing numbers are to be recorded, write switch 208 is opened. The application of a logic "1" from write switch 208 and a logic "1" from one-shot 205 to both inputs of gate 206 sets gate 206 to a logic "0", which in turn sets latch 210 to a logic "1". With this setting, latch 210 provides an enable signal the entire time during which timing numbers are to be recorded.

Gate 211 provides a reset delay signal for every pulse of the 10–PPS signal during the presence of the enable signal. The reset delay is utilized to reset both the sweep counter and decoder 35 and the shift register 40 for each pulse of the 10–PPS signal.

The sweep reset is a pulse produced by the multiplexer 17 at the beginning of each horizontal ramp signal. This signal is connected along with the enable signal to a gate 213. Gate 213 provides a gated reset pulse for each sweep reset pulse during the presence of the enable signal.

As previously discussed, the one-shot 205 fires immediately from the start signal if the delay switch 204 is on position 0. Thereupon with the write switch 208 open, an enable signal is provided for each 100-ms timing pulse during the period for which timing numbers are to be recorded, beginning with the first 100-ms timing pulse. The first timing number, 0.0, is therefore recorded adjacent the first 100-ms timing line recorded on the photographic material. However, it is a specific feature herein that the timing numbers may be delayed in time on the recording. More particularly, the recording of timing numbers is delayed by the setting of delay switch 204. For a setting of switch 204 on any position other than position 0, one-shot 205 is fired, not by the start signal but, by the count from the tenths counter and decoder 31 reaching the count coupled to the input of one-shot 205 by the position setting of switch 204. A setting of switch 204 on position 0.9, for example, will cause one-shot 205 to fire upon the count of 0.9, that is, upon the recording of the ninth 100-ms timing line. The first timing number 0.0 is therefore recorded adjacent the ninth 100-ms timing line.

The timing lines are generated by a timing line generator in the plotter 21. Three timing lines of distinct densities are provided: 1-second timing lines, 100-ms timing lines, and 10-ms timing lines. The 1-second timing lines are more heavily darkened than the 100-ms timing lines, and the 100-ms timing lines are more heavily darkened than the 10-ms timing lines. It is a specific feature of the invention that the first timing line which is to be marked with the timing number 0.0 be of the darkness of a 1-second timing line. This is accomplished by providing an FB reset signal from one-shot 205 to the timing line generator in the plotter 21. Utilizing the same example as above with switch 204 on position 0.9 for purposes of explanation, the one-shot 205 is fired upon the count of 0.9. When one-shot 205 fires, the logic "0" signal on line 216 is inverted by inverter 217 and applied as the FB reset signal to the plotter 21. The FB reset signal in turn causes the timing line at count 0.9, which is to be marked with the timing number 0.0, to be of the darkness of a 1-second timing line. Thereafter, every 1-second timing line generated by plotter 21 will be more heavily darkened than the 100-ms timing lines, and the 100-ms timing lines will be more heavily darkened than the 10-ms timing lines.

The foregoing-detailed description of the invention has described the timing number as being produced beginning 220 microseconds after the start of each sweep of the electron beam. However, adjustment of the time period of one-shot multivibrator 150 between the limits of 75–150 microseconds can increase or delay this starting point.

The following paragraphs set forth and describe certain components which have been utilized in one specific embodiment of the invention.

A magnetic tape unit suitable for use with the foregoing-described system is the TIDAR, a digital analog recorder manufactured by Texas Instruments Incorporated, Dallas, Texas. The TIDAR system stores magnetic tape input data in a buffer memory. The buffer memory transfers words under clock control to a digit register for conversion to analog signals. The analog signals are applied to the multitrace electronic camera 16. The memory buffer controls the net data rate from the magnetic tape to prevent the overflow or emptying of the memory until the transfer of analog signals to the multitrace electronic camera 16 is complete. This ensures that the cathode-ray tube display will be at a continuous and uniform data rate from beginning to end of the data transfer for the 24 seismic channels.

A multitrace electronic camera suitable for use in the system described herein is the Model MEC-630-A manufactured by Geo Space Corporation of Houston, Texas. Such multitrace electronic camera comprises a multiplexer 17 which contains twenty-four seismic signal multiplexers, one for each seismic channel. The multiplexers convert the seismic analog signals to pulse width modulation signals suitable for cathode-ray tube presentation. These modulation A multitrace electronic camera suitable for use in the system described herein is the Model MEC-630-A manufactured by Geo Space Corporation of Houston Texas. Such multitrace electronic camera comprises a multiplexer 17 which contains twenty-four seismic signal multiplexers, one for each seismic channel. The multiplexers convert the seismic analog signals to pulse width modulation signals suitable for cathode-ray tube presentation. These modulation signals intensity modulate the electron beam as it sweeps across the face of cathode-ray tube 19. A linear sweep or horizontal ramp signal of 250-microseconds duration is generated and applied to the cathode-ray tube to control the sweep of the electron beam across the face of the display. The horizontal ramp signal also gates the 24 multiplexers ON and OFF once for each sweep of the electron beam or every 250 microseconds. The 24 multiplex outputs are applied by gate 18 to cathode-ray tube 19.

A plotter suitable for use with the system described herein is the PL-600 Series Cross-Section Plotter manufactured by Dresser SIE, Inc., Houston, Texas. The PL-600 Cross-Section Plotter produces a 5.5-second photographic record at the rate of 7.5 inches per second.

The multitrace electronic camera 16 exposes only a small portion of the total plotter width in a given 24 seismic trace plot. In order to plot additional 24 seismic trace recordings adjacent to previous recordings, the camera is mounted on a movable assembly which may be automatically stepped laterally to the next 24 seismic trace recording position.

The sweep counters 50 and 51, the decimal timing counter 90, and the unit timing counter 120 may be of a Motorola type MC838P. The decimal decoder 91 and unit decoder 121 may be a Texas Instruments Incorporated type SN7442. The one-shot multivibrators 58, 65, 74, 79, 150-156, 190, and 191 may be a Texas Instruments Incorporated type SN74121.

Various modifications to the disclosed embodiment, as well as alternate embodiments, may become apparent to one skilled in the art without departing from the scope and spirit of the invention as defined by the appended claims.

What I claim is:

1. A system for photographically reproducing seismic data stored on magnetic tape, comprising:
   a. means for successively sampling traces of seismic data,
   b. a visual reproduction system including a cathode-ray tube,
   c. means for applying said samples to said reproduction system to successively intensity modulate the electron beam of said cathode-ray tube one time during each sweep of said electron beam across the face of said cathode-ray tube for each of said plurality of traces,
   d. means for photographically reproducing each successive sweep of said electron beam across the face of said cathode-ray tube to produce a continuous recording for each of said plurality of seismic traces,
   e. means for generating timing lines,
   f. a counter for counting the occurrence of said timing lines,
   g. means responsive to said counter for producing timing number signals and for applying said timing number signals to said reproduction system to intensity modulate said electron beam during sweeps thereof to cause to be produced on the face of said cathode-ray tube at any one time one component part of a timing number identifying the time occurrence of its associated timing line, said means including
      first means, triggered at the start of each sweep of said electron beam, for providing a timing pulse for the portion of each of said sweeps during which seismic data is to be recorded, and
      second means, triggered by the trailing edge of said timing pulse from said first means, for providing a plurality of successive timing pulses, said timing pulses representing the times during the sweeps of said electron beam at which said timing number signals are to be applied to said reproduction system.

2. The system as set forth in claim 1 wherein said second means includes a plurality of means connected in series such that the trailing edge of the pulse from each of said plurality of means triggers the succeeding one of said plurality of means such that said plurality of successive timing pulses are generated.

3. The system as set forth in claim 1 wherein said counter includes:
   a. a unit counter for providing a plurality of count pulses representative of the unit numeral of the number of timing lines counted by said unit counter, and
   b. a tenths counter for providing a plurality of count pulses representative of a tenths numeral of the number of timing lines counted by said tenths counter, and wherein said plurality of successive timing pulses include:
   a. at least a first timing pulse representing the time during the sweep of said electron beam at which the intensity modulation of said electron beam is to be begun for the production of the unit numeral of said number on the seismic trace recording, and
   b. at least a second timing pulse representing the time during the sweep of said electron beam at which the intensity modulation of said electron beam is to be begun for the production of the tenths numeral of said number on the seismic trace recording.

4. The system as set forth in claim 3 further including a third timing pulse representing the time during the sweep of said electron beam at which the intensity modulation of said electron beam is to be begun for the production of a decimal point at a location on the seismic trace recording between the unit numeral and the tenths numeral.

5. The system as set forth in claim 3 further including third means responsive to said tenths counter for permitting the triggering of said first means only after a preselected number of occurrences of said timing lines, whereby the first timing line marked with a timing number is other than the first timing line generated.

6. In the system as set forth in claim 5 in which said timing lines are of first, second and third densities for each 1-second, 100-millisecond, and 10-millisecond timing lines, respectively, said third means controls said means for generating said timing lines such that the first timing line recorded after said preselected number of occurrences of said timing lines and every 1-second timing line generated thereafter is of said first density, every 100-millisecond timing line recorded after said preselected number of occurrences of said timing lines is of said second density, and every 10-millisecond timing line recorded after said preselected number of occurrences of said timing lines is of said third density.

* * * * *